(12) United States Patent
Kang

(10) Patent No.: US 12,096,866 B2
(45) Date of Patent: Sep. 24, 2024

(54) INFANT CARRIER OR ARTICLE CARRIER

(71) Applicant: PCO NHAC CO., LTD., Daegu (KR)

(72) Inventor: Oh Hyun Kang, Daegu (KR)

(73) Assignee: PCO NHAC CO., LTD., Daegu (KR)

( * ) Notice: Subject to any disclaimer, the term of this patent is extended or adjusted under 35 U.S.C. 154(b) by 189 days.

(21) Appl. No.: 17/777,279

(22) PCT Filed: Nov. 25, 2020

(86) PCT No.: PCT/KR2020/016816
§ 371 (c)(1),
(2) Date: May 17, 2022

(87) PCT Pub. No.: WO2021/107594
PCT Pub. Date: Jun. 3, 2021

(65) Prior Publication Data
US 2022/0408939 A1    Dec. 29, 2022

(30) Foreign Application Priority Data

Nov. 27, 2019   (KR) ........................ 10-2019-0154894

(51) Int. Cl.
*A47D 13/02* (2006.01)
*B25J 9/00* (2006.01)
(52) U.S. Cl.
CPC .......... *A47D 13/027* (2022.08); *B25J 9/0006* (2013.01)
(58) Field of Classification Search
CPC .............................. A47D 13/027; B25J 9/0006
(Continued)

(56) References Cited

U.S. PATENT DOCUMENTS 690,122 A * 12/1901 Slagle .................... A47C 9/025
297/4
2,099,345 A * 11/1937 Olszanowski ........... A47C 9/10
297/4
(Continued)

FOREIGN PATENT DOCUMENTS

| KR | 1020150039640 | 4/2015 |
| KR | 101730731 | 4/2017 |
| KR | 1020190048130 | 5/2019 |

*Primary Examiner* — Peter N Helvey
(74) *Attorney, Agent, or Firm* — Harvest IP Law LLP

(57) ABSTRACT

The present invention provides an infant carrier or article carrier that includes a support part configured to support an infant or an article, a leg part which is in the form of a leg, connected from both directions to the support part through an upper portion, and configured to connect the support part to a bottom surface disposed at a lower portion, a movement assisting part which is disposed above the leg part, connected from both directions to the support part, and configured to distribute the weight of the infant on the support part or the load of the article on the support part to correspond to a movement state of a user and adjust an angle to correspond to the movement state of the user in order to facilitate movement, a knee joint part which is in the form of a knee and has one side surface coupled to the movement assisting part disposed thereabove to allow the angle adjustment corresponding to the movement state and the other side surface coupled to the leg part disposed therebelow, and a bottom surface contact part which has one side surface coupled to one side surface of the leg part and the other side surface allowing the leg part to be stably supported on the bottom surface.

3 Claims, 11 Drawing Sheets

(58) Field of Classification Search
USPC .......................................................... 224/159
See application file for complete search history.

(56) References Cited

U.S. PATENT DOCUMENTS

| | | | | |
|---|---|---|---|---|
| 6,006,970 | A * | 12/1999 | Piatt | A45F 3/14 |
| | | | | 224/259 |
| 7,396,083 | B2 * | 7/2008 | Kasner | A01K 97/00 |
| | | | | 297/195.11 |
| 7,594,696 | B2 * | 9/2009 | Girard | B62J 1/08 |
| | | | | 297/130 |
| 2011/0264014 | A1 * | 10/2011 | Angold | B66D 3/18 |
| | | | | 212/255 |
| 2011/0266323 | A1 * | 11/2011 | Kazerooni | B25J 9/0006 |
| | | | | 224/575 |
| 2015/0230623 | A1 * | 8/2015 | Oh | A47D 13/027 |
| | | | | 224/161 |
| 2016/0089307 | A1 * | 3/2016 | Oh | A61J 9/0669 |
| | | | | 224/159 |
| 2016/0106228 | A1 * | 4/2016 | Wang | A47D 13/027 |
| | | | | 224/159 |
| 2019/0133866 | A1 * | 5/2019 | Tsai | G05B 1/01 |
| 2019/0142618 | A1 * | 5/2019 | Hyung | B25J 9/0006 |
| | | | | 602/16 |
| 2019/0152047 | A1 * | 5/2019 | Tosh | A61F 5/0123 |
| 2019/0159954 | A1 * | 5/2019 | Ozsecen | B25J 9/0006 |
| 2019/0183713 | A1 * | 6/2019 | Sankai | A61B 5/4851 |
| 2019/0184547 | A1 * | 6/2019 | Garrec | A61H 1/02 |
| 2019/0201273 | A1 * | 7/2019 | Soltani-Zarrin | B25J 9/0006 |
| 2019/0201274 | A1 * | 7/2019 | Teng | A61H 3/00 |

\* cited by examiner (a)                  (b)

(a) (b)

INFANT CARRIER OR ARTICLE CARRIER

TECHNICAL FIELD

The present invention relates to an infant carrier or article carrier, and more particularly, to an infant carrier or article carrier that, while being leaned against a user's leg, thigh, or the like, allows a user to freely move while supporting an infant or carry a heavy article such as a parcel.

BACKGROUND ART

Generally, infant carriers are used to carry and care for infants more conveniently and safely when going out with infants who are young or cannot toddle on their own.

Such infant carriers are configured to be worn on a user's upper body and allow the user to support an infant by positioning the infant on the chest or back.

However, most of the conventional infant carriers are configured to be worn on a user's upper body such as the shoulders or waist using a belt or the like, and thus the infant's weight is directly transferred to the user's upper body.

In recent years, in order to address such a problem, an infant carrier that can serve as both a baby wrap, which allows a user to hold a baby using a waist strap and a shoulder strap, and a hip seat, on which the user can place the baby's buttocks, has been released. However, there is still a problem in that a considerable strain is placed on the user's spine, which makes it not easy to carry and care for an infant.

Further, infant carriers or article carriers which partially address the above problem are mostly suitable for users in a stationary state and cause an inconvenience due to their weight when the users move.

Thus, there is a need for a portable carrier that has a wearable mechanism and can not only be utilized as an infant carrier but also be utilized for various other purposes such as carrying parcels.

DISCLOSURE

Technical Problem

The present invention is directed to providing an infant carrier or article carrier that is a wearable type and, while being leaned against a user's leg, thigh, or the like, allows a user to freely move while supporting an infant or carry a heavy article such as a parcel.

The present invention is also directed to providing an infant carrier or article carrier that, by using a cam structure without a separate motor, supports an infant's weight or an article's weight and facilitates movement of a user by not placing much strain on the user while the user moves, thus providing user convenience.

Technical Solution

The present invention provides an infant carrier or article carrier that includes a support part configured to support an infant or an article, a leg part which is in the form of a leg, connected from both directions to the support part through an upper portion, and configured to connect the support part to a bottom surface disposed at a lower portion, a movement assisting part which is disposed above the leg part, connected from both directions to the support part, and configured to distribute the weight of the infant on the support part or the load of the article on the support part to correspond to a movement state of a user and adjust an angle to correspond to the movement state of the user in order to facilitate movement, a knee joint part which is in the form of a knee and has one side surface coupled to the movement assisting part disposed thereabove to allow the angle adjustment corresponding to the movement state and the other side surface coupled to the leg part disposed therebelow, and a bottom surface contact part which has one side surface coupled to one side surface of the leg part and the other side surface allowing the leg part to be stably supported on the bottom surface.

Also, the movement assisting part may include a connecting part which is connected to the leg part on both directions from the bottom part and connected to the support part from the top part, and a cam structure for adjusting the displacement of the spring and the angle of the connecting part between the spring and the connection part according to the movement state of the user.

Also, the cam structure may have a hemispherical shape.

Also, the movement assisting part may further include a seat rotating part which is connected to the connecting part through a lower portion, connected to the support part through an upper portion to support the support part, and configured to allow the support part to maintain a horizontal axis even during movement.

Also, the movement assisting part may further include a piston rod part which has one side surface connected to the connecting part to support the connecting part and which vertically moves in a cylindrical case, and an outer peripheral surface of the piston rod part may be covered by a spring configured to absorb the load of the support part.

Also, the leg part may include a first rod which has one side surface connected to the support part to support the support part and the other side surface connected to the knee joint part which is a knee-shaped variable weight part, a second rod which serves as an external housing that is concentric with the first rod and embeds and covers the first rod, a pin which is formed at one side of the first rod, and a coil spring which is coupled to an inner portion of the second rod.

The above-described major problem-solving means of the present invention will be described more specifically and clearly through examples in "Modes of the Invention," the accompanying "Drawings," and the like which will be described below. Here, in addition to the major problem-solving means described above, various other problem-solving means according to the present invention will be further presented and described.

Advantageous Effects

According to the present invention, when a user walks or travels while wearing an infant carrier or article carrier and supporting a considerable weight such as an infant's weight or an article's load through a movement assisting part, the infant's weight or the article's load is distributed according to a movement state of the user by transmitting a force in the direction of gravity. Therefore, the weight placed on the user while the user moves can be reduced by about 10 kg or more, and thus user convenience can be provided.

Also, the infant's weight or the article's load is, while being supported, transmitted to the carrier instead of being transmitted to the user's upper body. Accordingly, it is possible to prevent the user's lower back pain and prevent kyphosis or scoliosis.

MODES OF THE INVENTION

Exemplary embodiments of the present invention will be described below with reference to the accompanying drawings.

Figure 1:
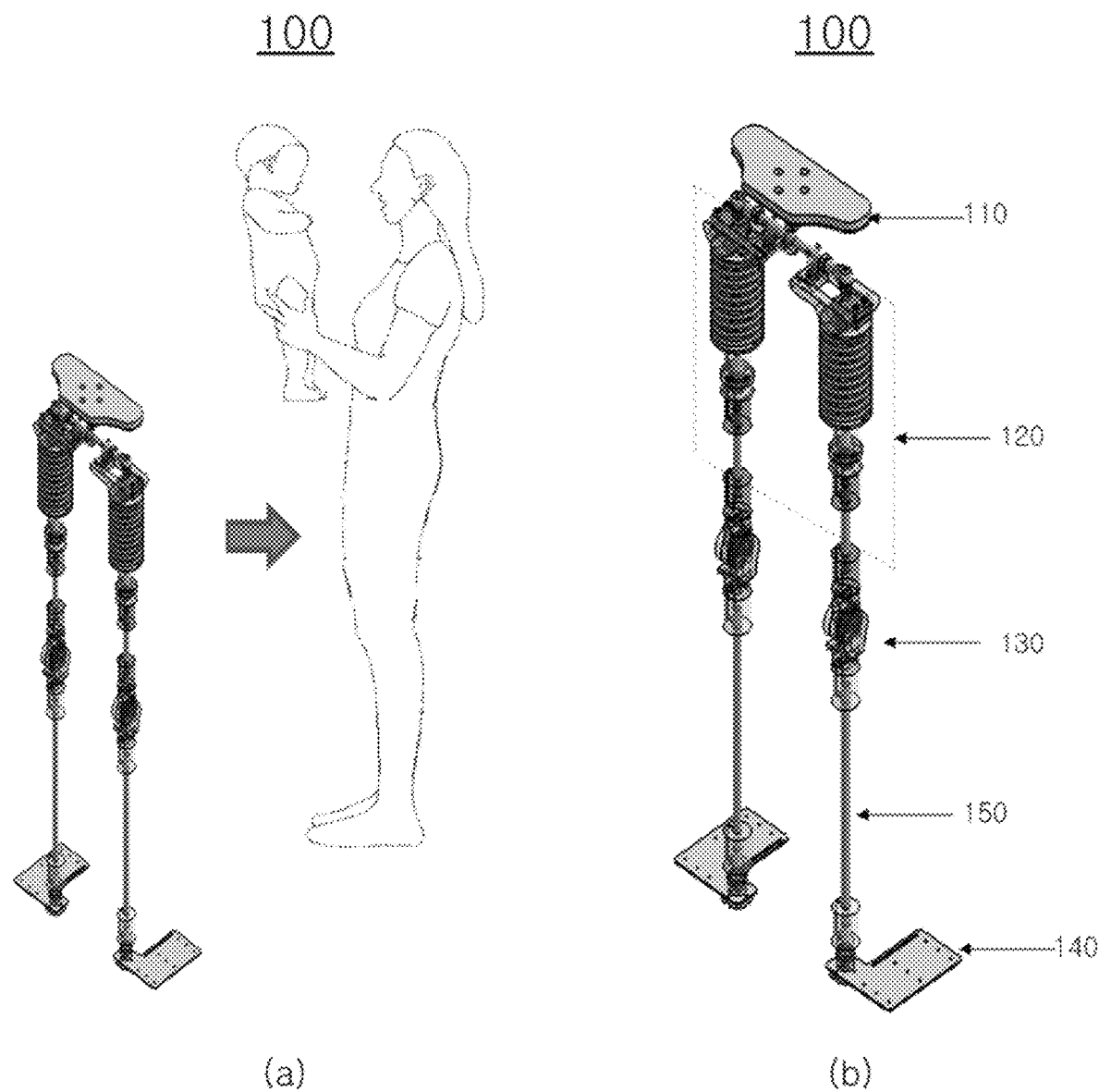
FIG. 1 is a schematic view illustrating an infant carrier or article carrier (100) according to an exemplary embodiment of the present invention.

FIG. 1 is a view illustrating an infant carrier or article carrier 100 according to an exemplary embodiment of the present invention, wherein FIG. 1A is a perspective view illustrating a user and the infant carrier or article carrier together, and FIG. 1B is a perspective view illustrating only the infant carrier or article carrier. FIGS. 2 to 6 are views for describing states of traveling using a movement assisting part 120 in the infant carrier or article carrier 100 of FIG. 1. Here, the illustrated infant carrier or article carrier 100 shows a basic structure or framework structure of the overall device, and an external housing which covers the basic structure or framework structure may be added for aesthetics or ornamental design. However, description thereof will be omitted, and the basic structure will be mainly described.

Referring to FIG. 1, the infant carrier or article carrier 100 according to an exemplary embodiment of the present invention includes a support part 110 which is configured to support a part of an infant's body such as the infant's legs or buttocks (usually the infant's buttocks) placed thereon or support an article to be transported such as a parcel placed thereon, the movement assisting part 120 which is connected from both left and right sides to the support part 110 and configured to distribute the weight of the infant on the support part 110 or the load of the article on the support part 110 to correspond to a movement state of a user and adjust an angle to correspond to a walking or traveling state in order to facilitate movement, and a leg part 150 which has the shape of a leg as a whole and is connected to the movement assisting part 120 and a bottom surface contact part 140 to connect the support part 110 at the uppermost portion and the bottom surface contact part 140 at the lowermost portion to each other.

Here, the infant carrier or article carrier 100 has a wearable mechanism and may be configured to be worn in various forms. For example, in the leg part 150, a first shin support (not illustrated) or a second shin support (not illustrated) may be formed using a housing. Also, the first shin support may be movable in a vertical direction and utilized as a support for a thigh located above or may allow the shin or the thigh to be connected to the infant carrier or article carrier 100 through a band or a fastening belt.

The leg part 150 is in the form of a leg as a whole, is formed as a pair of leg parts 150 that are disposed at left and right sides and symmetrical to each other, is connected to the bottom surface contact part 140 at the lowermost portion to allow support by a bottom surface, and is connected, through the uppermost portion thereof, to the support part 110 supporting the infant's weight or the article's load. Here, since the leg parts 150 constitute a connection structure in the form of a framework and constitute a support structure which is a rod-type structure made of rods, metal or rigid plastic may be used as the material of the leg parts 150.

Also, while the weight of the infant placed above or the load of the article placed above is supported through the support part 110, the leg parts 150 may transmit and distribute the force due to the infant's weight or the article's load to the bottom surface through the bottom surface contact part 140 disposed below. In this way, a stable support structure may be easily formed.

Also, the length of the leg part 150 is adjustable. That is, according to whether the user sits or stands, when the user remains standing, length adjustment according to the user's height or the height of a part of the user's body to be supported such as the user's thighs, buttocks, or lower back is necessary. Also, when the user is sitting, length adjustment according to the sitting height is necessary. In addition, the leg part 150 may be implemented to have an elastic structure to absorb impact.

Also, above the leg part 150, the movement assisting part 120 which is connected from both left and right sides to the support part 110 and is configured to, as a wearable type, distribute the weight of the infant on the support part 110 or the load of the article on the support part 110 to correspond to a movement state of the user and adjust an angle to correspond to a walking or traveling state in order to facilitate movement is formed. Here, since the infant carrier or article carrier 100 according to the present invention has a wearable structure and uses the movement assisting part 120 to, when the user walks or travels while supporting a considerable weight such as the infant's weight or the article's load, distribute the infant's weight or the article's load to correspond to the movement state of the user, the weight placed on the user (the infant's weight or the article's load) while the user moves is reduced by about 10 kg or more. This will be described in detail below with reference to FIGS. 2 to 6.

Also, the infant carrier or article carrier 100 includes a knee joint part 130 which is in the form of a knee and has one side surface coupled to the movement assisting part 120 disposed thereabove to allow the angle adjustment corresponding to the movement state and the other side surface coupled to the leg part 150 disposed therebelow. That is, the movement assisting part 120 disposed above and the leg part 150 disposed below are connected through the knee-shaped knee joint part 130.

Also, the infant carrier or article carrier 100 includes the bottom surface contact part 140 which is coupled to one side surface of the leg part 150 and comes into contact with a bottom surface, such as the ground, to allow the leg part 150 to be stably supported on the bottom surface. Here, the bottom surface contact part 140 may further include a bottom plate 141 which is disposed at a lower portion and an ankle joint part 142 which is disposed at a connecting part between the leg part 150 and the bottom plate 141. Also, the ankle joint part 142 enables the bottom plate 141 to rotate a predetermined angle and freely move vertically or horizontally on the ground. Also, the bottom surface contact part 140 may be formed to have a footrest structure that supports the user's feet. In addition, the bottom surface contact part 140 may be formed to have an arched structure or the like to distribute the force due to the infant's weight or the article's load that is transmitted by the leg part 150.

Also, in a case in which the support part 110 is configured to carry an infant, the support part 110 may be a portion formed to support a baby while the baby is placed thereon and may be configured to have various different structures, such as a plate-shaped structure on which the baby's legs can be placed and a chair structure on which the baby can sit, according to embodiments. Also, the support part 110 may be configured by adding a cushioning material or a structure similar thereto on a portion that comes into contact with a part of the baby's body such as the baby's feet or buttocks. Also, a safety wearable structure formed of a belt or the like to be worn around the baby's body may be further included in the support part 110 in order to prevent the baby from falling. Also, in a case in which the support part 110 is for carrying an article, an edge that surrounds the entire support part 110 may be formed to prevent an article from falling while being carried, or a string tying structure, an article-carrying box structure, or the like may be further added to fix the article to the support part. The support part 110 may be made of a hard synthetic resin material or a lightweight metal material that can basically support and transmit a load. Preferably, a cushioning material may be added mostly to a portion of the support part 110 that comes into contact with an infant's buttocks or the user's buttocks or lower back.

The main components constituting the infant carrier or article carrier 100 according to an exemplary embodiment of the present invention will be described in detail below.

Figure 2:
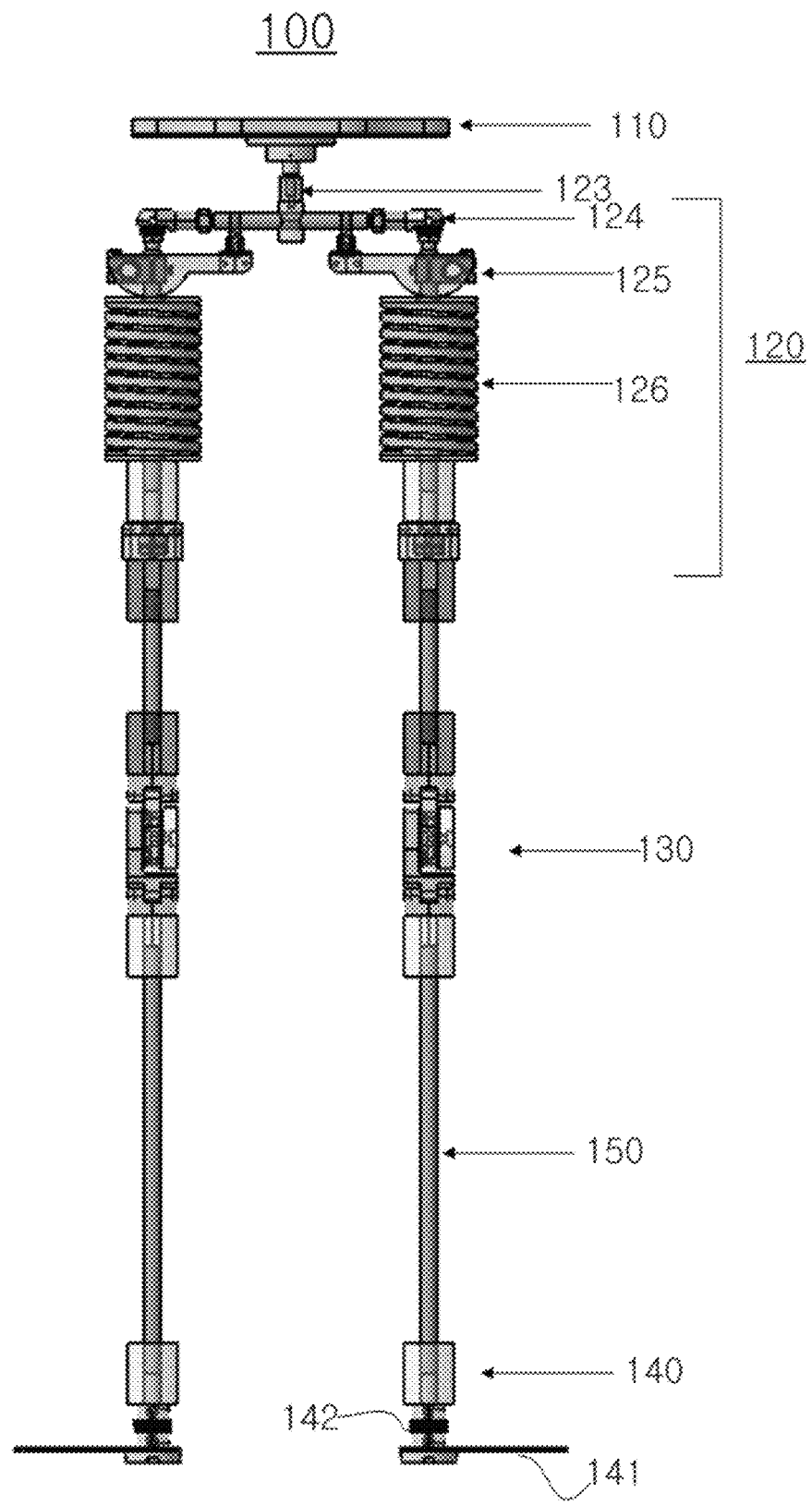
FIGS. 2 to 12 are views mainly illustrating states of traveling using a movement assisting part in the infant carrier or article carrier (100) of FIG. 1.
Figure 3:
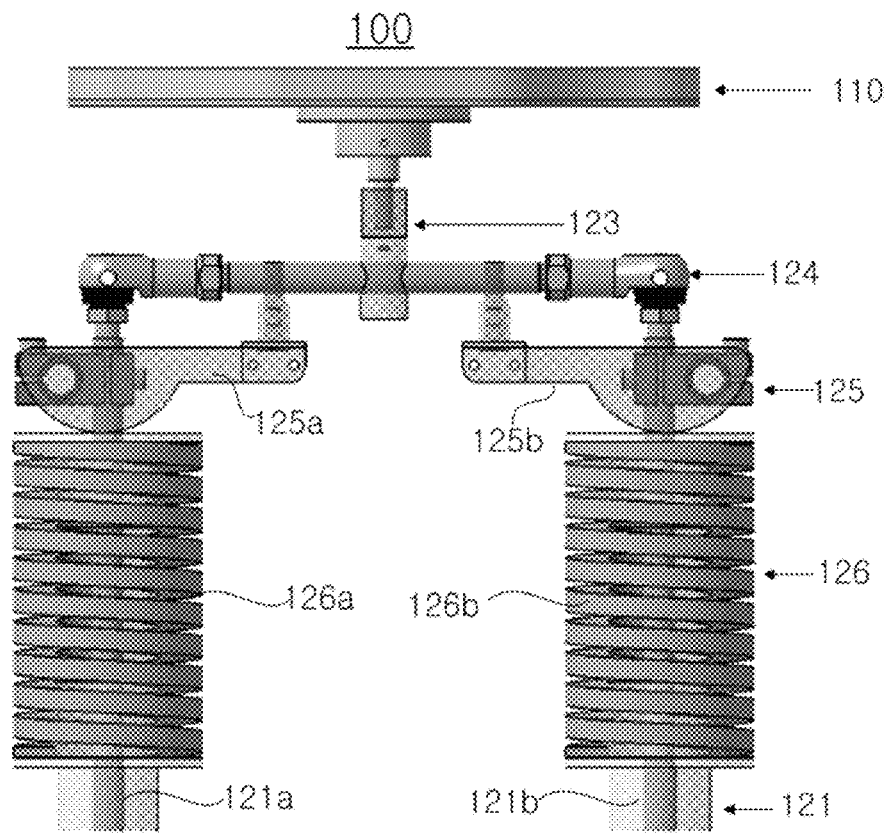
Figure 4:
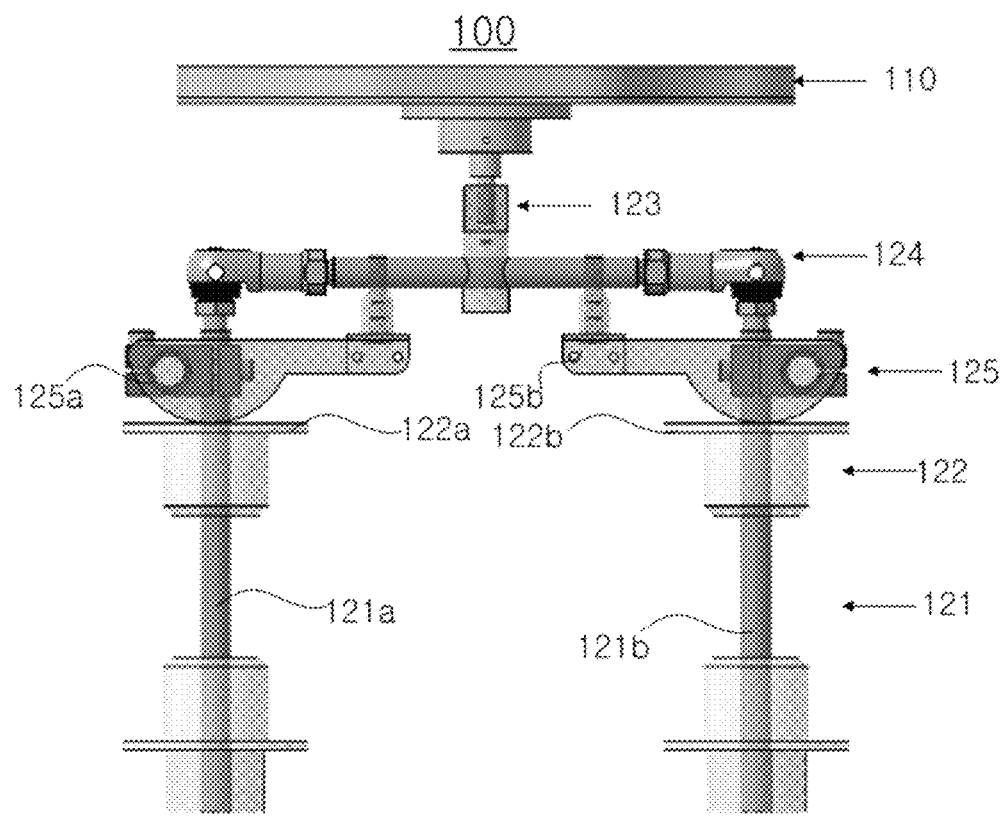
Figure 5:
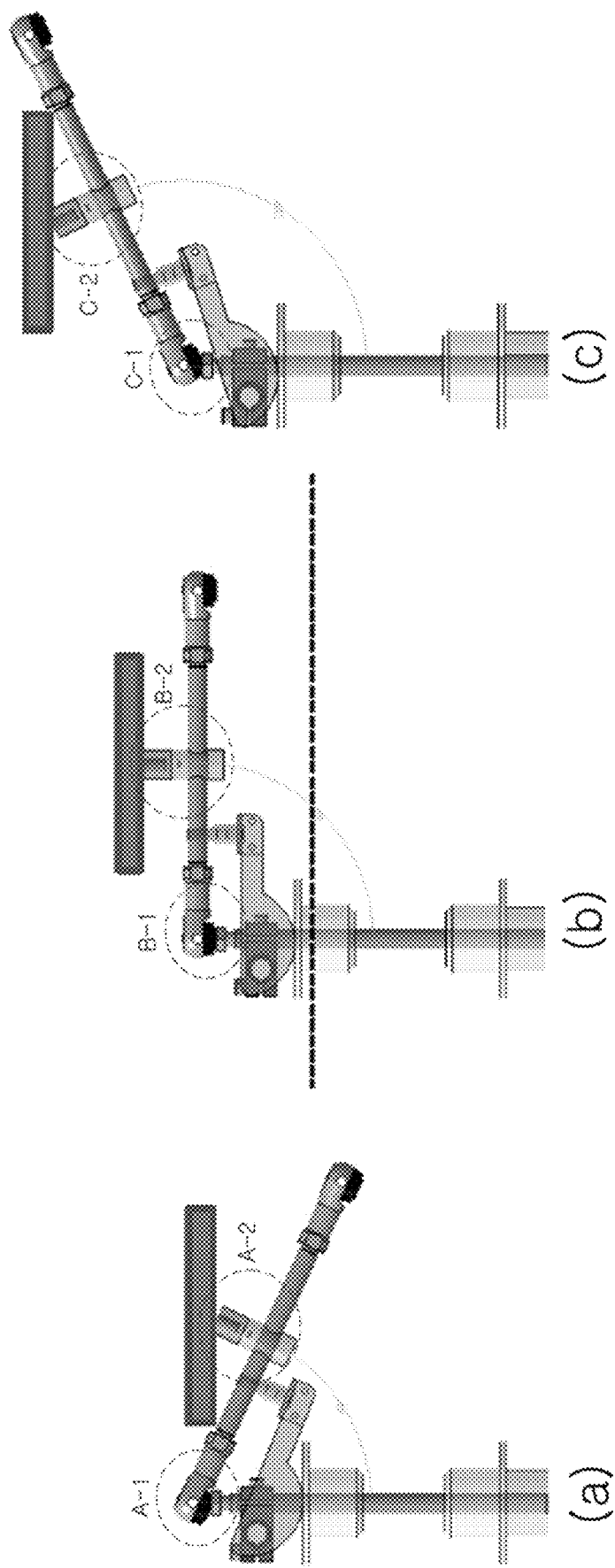

FIG. 2 is a front view illustrating the infant carrier or article carrier 100 of FIG. 1, FIG. 3 is a detailed enlarged view of the movement assisting part 120 in the infant carrier or article carrier 100 of FIG. 2, and FIG. 4 is a detailed view of a portion showing a state in which a spring part 125 is removed from the movement assisting part 120 in the infant carrier or article carrier 100 of FIG. 3.

FIGS. 5A to 5C are views illustrating a process in which the displacement of the movement assisting part 120 and a seat rotating part 123 is changed according to a user's movement state in the infant carrier or article carrier 100 of FIG. 3.

FIGS. 6 to 12 are screens obtained by capturing a simulation process in which the movement assisting part 120 adjusts an angle according to the user's movement state in the infant carrier or article carrier 100 of FIG. 3.

As illustrated in FIGS. 2 to 6, the movement assisting part 120 includes a connecting part 124 which is formed in a right-angled U-shape and connected to the leg parts 150, which are disposed at both side surfaces, through a lower portion and connected to the support part 110 through an upper portion and the seat rotating part 123 which is connected to the connecting part 124 through a lower portion and connected to the support part 110 through an upper portion to support the support part 110 and enable the support part 110 to rotate. Here, the seat rotating part 123 may be implemented in the form of a ball joint and maintain a horizontal axis even during movement in the vertical direction. Also, in the ball joint, a ball part is formed at an end of a connecting tube connected to the support part 110, the ball part is covered with a casing, and a gap thereof is sealed with a gasket, and in this way, the ball part can freely rotate in the casing. Also, the seat rotating part 123 may be horizontally unfolded (at 90°) during use of the support part 110 and remain folded in a vertical state (at 0°) when the support part 110 is not in use and may maintain a predetermined angle within a range of 0° to 90° using a hinge shaft. Also, a stopper structure (not illustrated) which serves to prevent further downward rotation of a multi-degree-of-freedom seat 110 that has rotated forward/rearward and upward/downward/leftward/rightward may be further provided in the seat rotating part 123. Since the stopper structure preventing further rotation is a widely-known configuration, illustration thereof has been omitted in the drawings, and description thereof will be omitted.

Also, the movement assisting part 120 includes a piston rod part 121 which has one side surface connected to the connecting part 124 to support the connecting part 124 and which vertically moves in a cylindrical case 122. Here, the piston rod part 121 includes a first piston rod part 121*a* and a second piston rod part 121*b* which support the connecting part 124 from left and right sides and correspond to portions of the leg parts 150 at both sides. Also, since the piston rod part 121 is a support structure which is a rod-type structure, materials such as metal or rigid plastic may be used for the piston rod part 121.

Also, the cylindrical case 122 is an external housing structure which is formed in a cylindrical shape and covers the piston rod part 121. The cylindrical case 122 includes a first cylindrical case 122*a* and a second cylindrical case 122*b* which are disposed at both left and right sides. Also, the piston rod part 121 has an upper portion which is connected from left and right sides to the connecting part 124 and a lower portion which, as a whole, corresponds to a portion of the leg part 150 that is connected to the knee joint part 130. Here, an outer peripheral surface of the piston rod part 121 is covered by a spring 126 configured to absorb the load of the support part 110, and the spring 126 is formed on the cylindrical cylinder 122. Also, the spring 126 includes a first spring 126*a* and a second spring 126*b* which are disposed at both left and right sides.

Also, a semicircular cam 125 which is configured to adjust the displacement of the spring 126 and adjust the angle of the connecting part 124 to correspond to the user's movement state is disposed between the connecting part 124 and the cylindrical case 122 which is integrally formed with the spring 126. Here, the piston rod part 121 supporting the connecting part 124 is formed to pass through the semicircular cam 125. Also, the semicircular cam 125 includes a first semicircular cam 125*a* and a second semicircular cam 125*b* which are symmetrically disposed at both left and right sides.

Here, the semicircular cam 125 has a cam structure and converts rotational motion along a semicircular axis into linear motion or reciprocating motion. Here, the semicircular cam 125 has a hemispherical form, has a rotating shaft disposed in the hemisphere of the cam, and comes into line contact with the spring 126 disposed therebelow to facilitate load transfer.

That is, a process in which the cam structures having a wearable structure convert motion to correspond to the user's movement state in a case in which the user continuously walks by taking a right step and then taking a left step will be described with reference to FIGS. 5A to 5C.

Referring to FIG. 5A, when the user takes a right step forward, the user's right leg moves, and accordingly, the second semicircular cam 125*b* rotates 65° from a vertical axis in the direction of gravity, the connecting part 124 connected to the second semicircular cam 125*b* moves downward due to the rotation of the second semicircular cam 125*b* by the predetermined angle, and the second spring 126*b* coming into line contact with the second semicircular cam 125*b* is compressed in the direction of gravity (the direction perpendicular to the ground) such that the displacement of the spring is increased as compared to a normal state.

Then, referring to FIG. 5B, there is no user movement and a stationary state is reached, and accordingly, the second semicircular cam 125*b* rotates 90° from the vertical axis in the direction of gravity to maintain a horizontal state, the connecting part 124 connected to the second semicircular cam 125b moves in the horizontal state due to the rotation of the second semicircular cam 125b by the predetermined angle, and the second spring 126b coming into line contact with the second semicircular cam 125b transmits a force of a load in the direction of gravity (the direction perpendicular to the ground) such that the compressed spring is restored to its original state, and the displacement of the spring is maintained in the normal state.

Then, referring to FIG. 5C, when the user takes a left step, the user's left leg moves, and accordingly, the second semicircular cam 125b rotates 115° in a state of being lifted from the horizontal state from the vertical axis in the direction of gravity, the connecting part 124 connected to the second semicircular cam 125b moves upward from the horizontal state due to the rotation of the second semicircular cam 125b by the predetermined angle, and the second spring 126b coming into line contact with the second semicircular cam 125b is compressed in the direction of gravity (the direction perpendicular to the ground) such that the displacement of the spring is decreased as compared to the normal state.

Here, the seat rotating part 123 may be implemented in the form of a ball joint as described above so that a horizontal axis can be maintained even during movement in the vertical direction in parts A-2, B-2, and C-2 indicated by dotted lines in FIGS. 5A to 5C. Also, as illustrated in other parts A-1, B-1, and C-1 indicated by dotted lines, according to the rotation of the second semicircular cam 125b by a predetermined angle, the connecting part 124 connected to the second semicircular cam 125b also maintains the horizontal axis even during the movement in the vertical direction. Thus, it can be seen that a portion where the second semicircular cam 125b and the connecting part 124 are coupled to each other is also implemented as a ball joint like the seat rotating part 123 or implemented in the form of another joint that implements two degrees of freedom. In this case, preferably, the coupling parts portion A-1, B-1, and C-1 where the semicircular cam 125 and the connecting part 124 are coupled may be configured as a universal joint. Such a universal joint has the advantage of enabling rotation while maintaining an oblique angle to each other.

FIGS. 6 to 12 are screens obtained by capturing a simulation process in which the movement assisting part 120 adjusts an angle according to the user's movement state in the infant carrier or article carrier 100 of FIG. 3.

Referring to FIGS. 6 to 12, since the displacement of the spring 126 changes according to an angle of rotation of the semicircular cam 125, and the weight of the infant on the support part 110 or the load of the article on the support part 110 is transmitted only in the direction of gravity (while the force of the load is distributed) even when the user walks, the weight placed on the user (the infant's weight or the article's load) is reduced by about 10 kg or more even when the user moves.

Unlike the conventional case in which a rod supporting the support part 110 moves vertically, in the present invention, the displacement of the spring 126 changes according to an angle of rotation of the semicircular cam 125, and thus the amount of movement of the rod can be minimized. Accordingly, unlike the conventional case in which a component force increases in the X-axis direction, in the present invention, a force of a load is transmitted in the Z-axis direction (the direction of gravity) to reduce the weight placed on the user (the infant's weight or the article's load) by about 10 kg or more even when the user moves.

Figure 6:
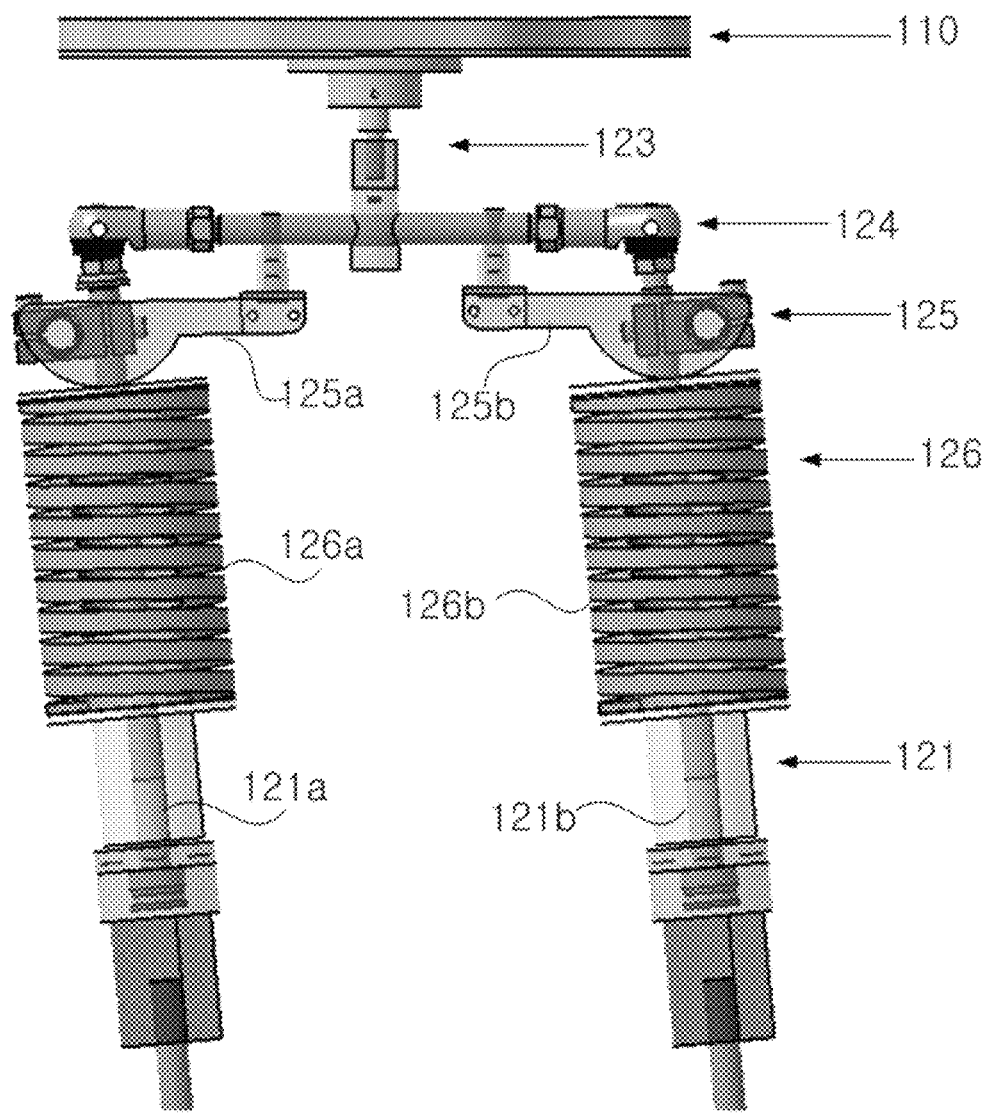

In relation to the above, a process in which the movement assisting part 120 of FIG. 6 adjusts an angle through roll motion and pitch motion according to the user's movement state will be described in detail with reference to FIGS. 7 to 12. Here, a contact point described below is the first contact point among the first contact point and the second contact point described above.

Figure 7:
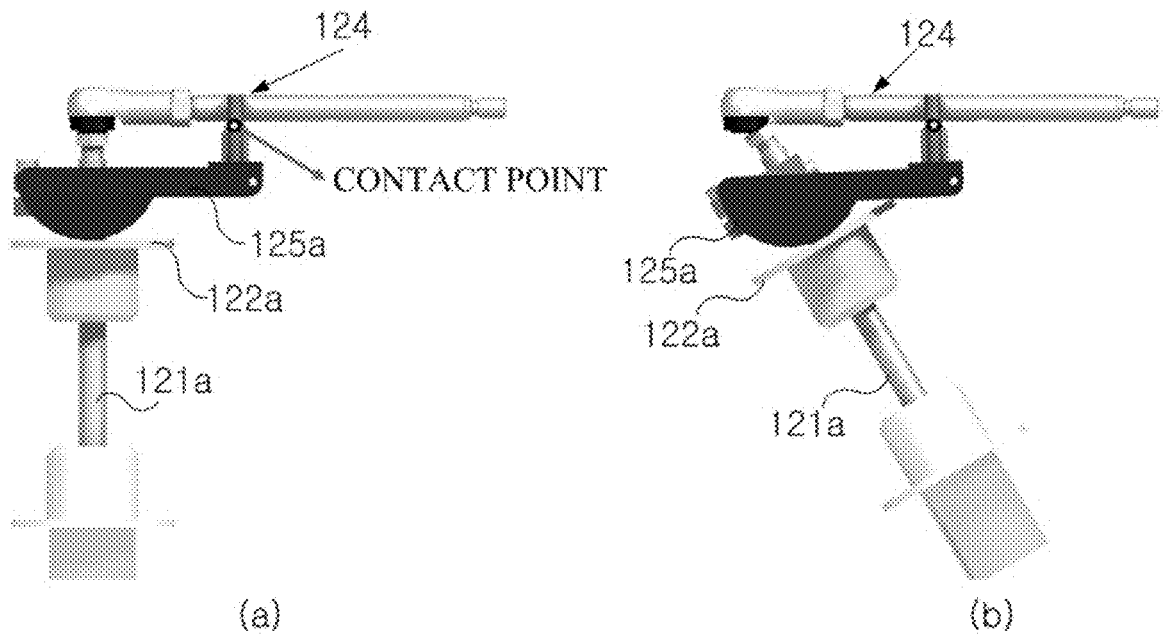
Figure 8:
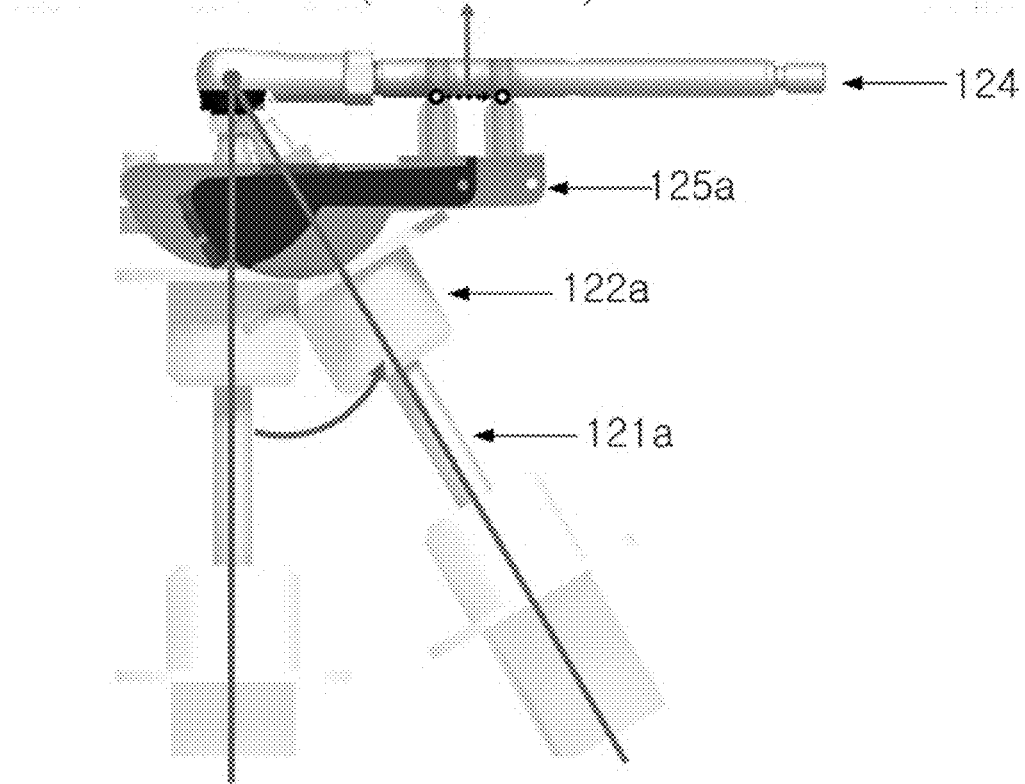

FIGS. 7 and 8 are views for describing roll motion from the front as motion in a state in which the user's right leg is moved inward by about 60° while the user is wearing the outer frame structure of the infant carrier or article carrier 100 of FIG. 1.

Referring to FIGS. 7 and 8, as described above, in the movement assisting part 120 of the infant carrier or article carrier 100 of FIG. 1, when, due to rotation of the first semicircular cam 125a, the first cylindrical case 122a which comes into contact with and supports the first semicircular cam 125a is pressed, the first spring 126a which is inserted into the first cylindrical case 122a and comes into line contact with the first semicircular cam 125a is also compressed, and thus a reaction force is generated. That is, the reaction force is generated according to movement in the state in which the right leg is moved inward by about 60°, and thus a movement trajectory (linear motion) is formed at the contact point at which the connecting part 124 and the first semicircular cam 125a comes into contact. That is, the contact point linearly moves a predetermined distance rightward, a reaction force is generated in the opposite direction of gravity at the contact point as the spring 126a is compressed, and the reaction force supports the roll motion.

Figure 9:
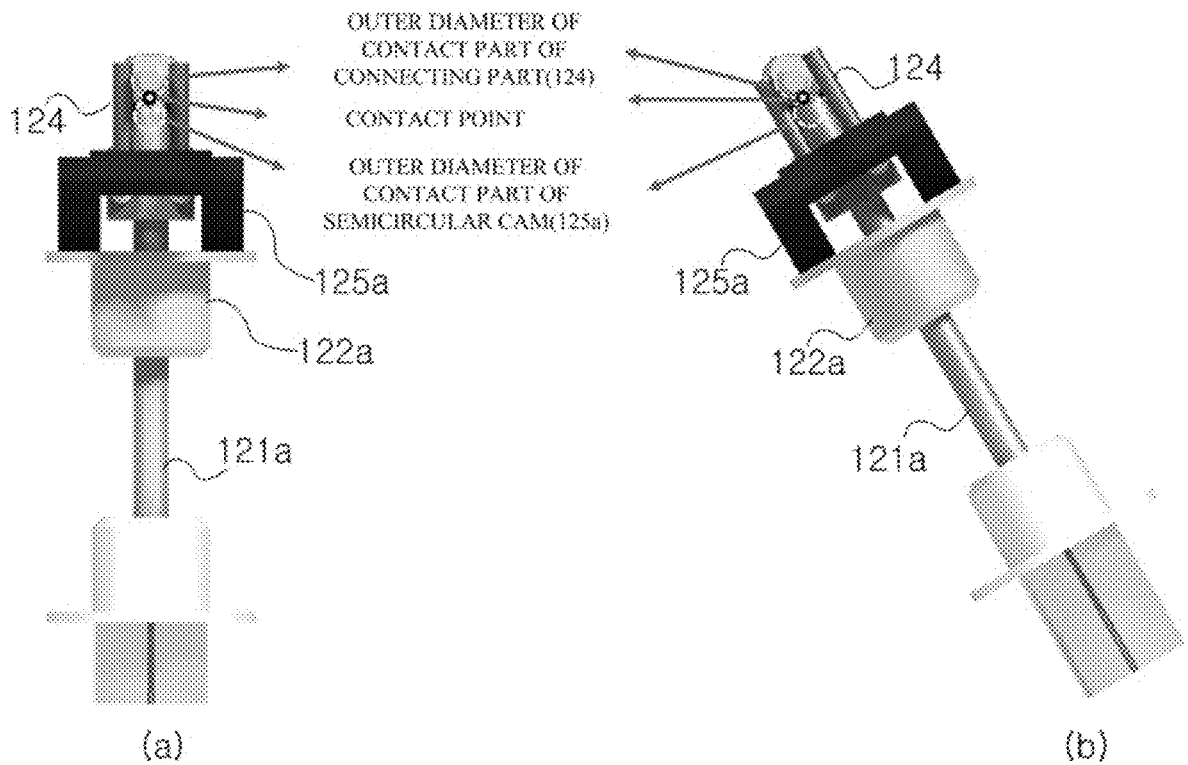
Figure 10:
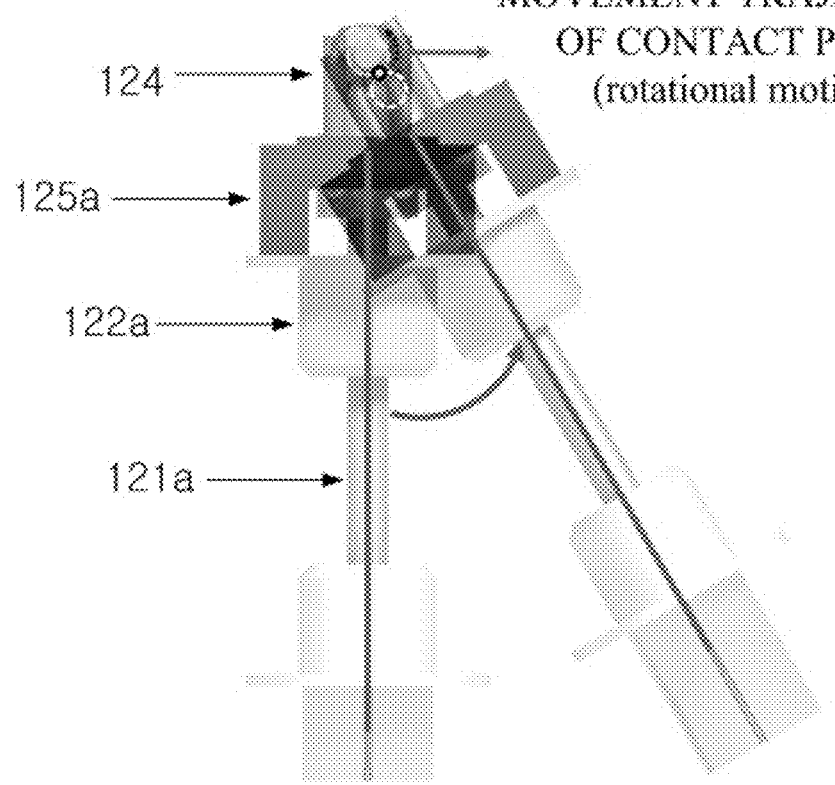

FIGS. 9 and 10 are views for describing pitch motion from the side in a state in which the user's right leg is moved inward by about 60° while the user is wearing the outer frame structure of the infant carrier or article carrier 100 of FIG. 1.

It can be seen that, while a reaction force is generated during the roll motion of the movement assisting part 120 in FIGS. 7 and 8, a reaction force is not generated during pitch motion from the side in FIGS. 9 and 10. That is, unlike the roll motion during which a linear movement trajectory is formed, during the pitch motion, a rotational movement trajectory in which the contact point rotates along an outer diameter of a contact part of the connecting part 124 is formed, and thus a reaction force is not generated.

Figure 11:
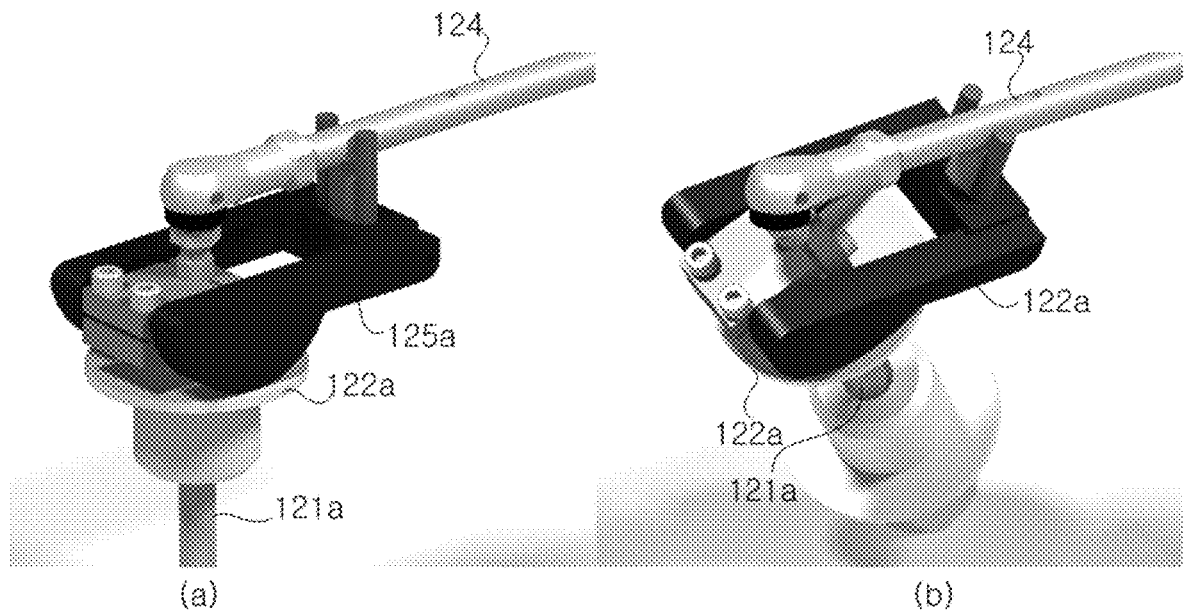
Figure 12:
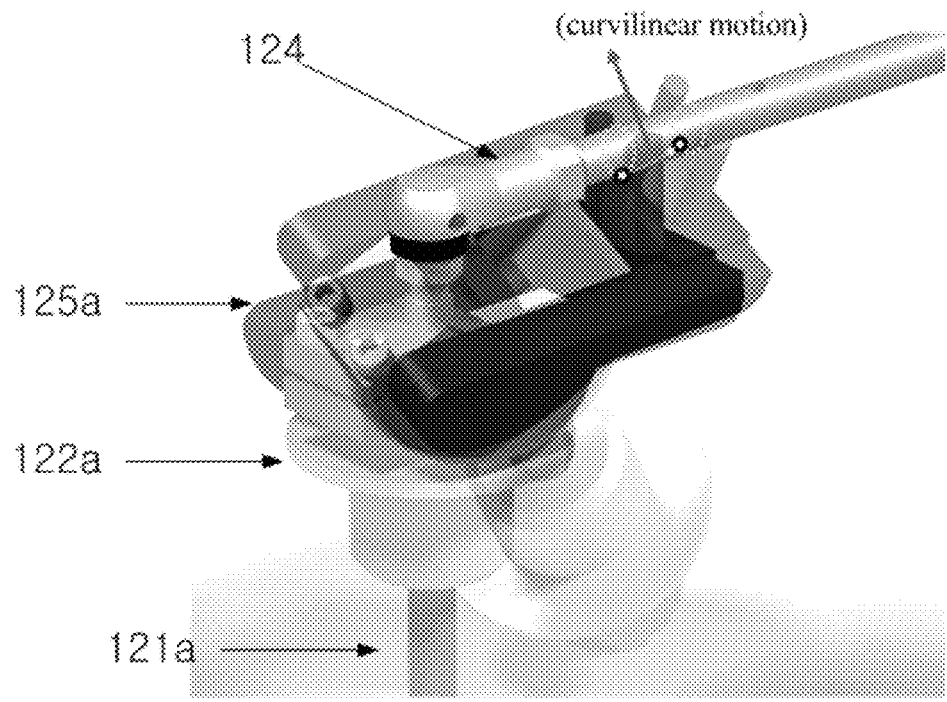

FIGS. 11 and 12 are planar views showing a state in which the roll motion and pitch motion of FIGS. 7 to 10 are simultaneously performed.

FIGS. 11 and 12 show a movement trajectory (curvilinear motion) of the contact point when the motion of the movement assisting part 120 is viewed from a plane. That is, a reaction force is generated in the opposite direction of gravity and the contact point forms a linear movement trajectory rightward due to the roll motion, and simultaneously, during the pitch motion, the contact point forms a rotational movement trajectory in which the contact point rotates along the outer diameter of the contact part of the connecting part 124 without linearly moving.

In this way, it can be rotated in two directions (roll motion and pitch motion) to ensure stable movement even when wearing the device. Also, since the roll motion and pitch motion can occur independently, there is an advantage in that control is easy due to not requiring torque compensation through a separately provided motor.

Figure 13:
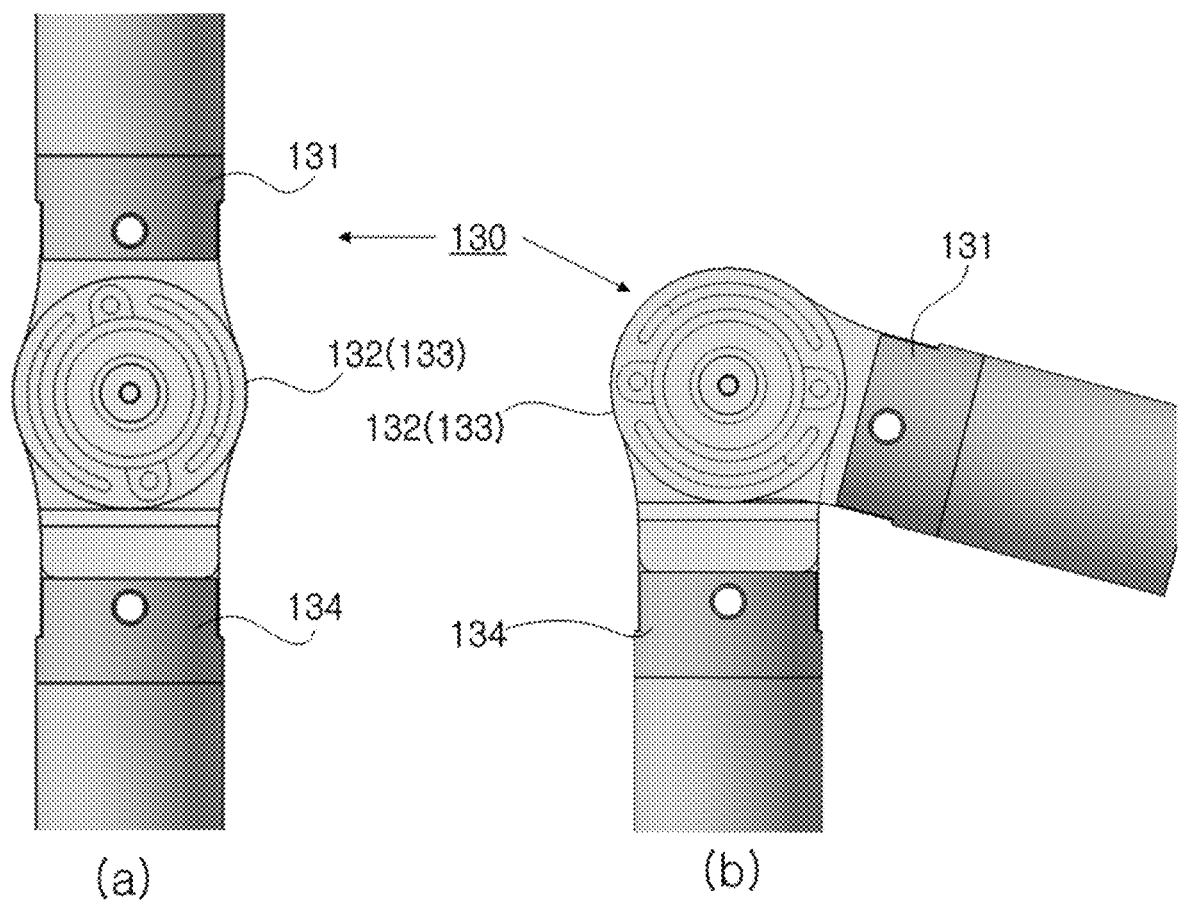
FIGS. 13 and 14 are views illustrating an embodiment of a knee joint part (130) in the infant carrier or article carrier (100) of FIG. 1.

FIG. 13 is a view illustrating an embodiment of the knee joint part 130 in the infant carrier or article carrier 100 of FIG. 1. FIG. 13A is a cross-sectional view illustrating a vertical state of the knee joint part 130, and FIG. 13B is a cross-sectional view illustrating a state in which the knee joint part 130 is tilted a predetermined angle.

Figure 14:
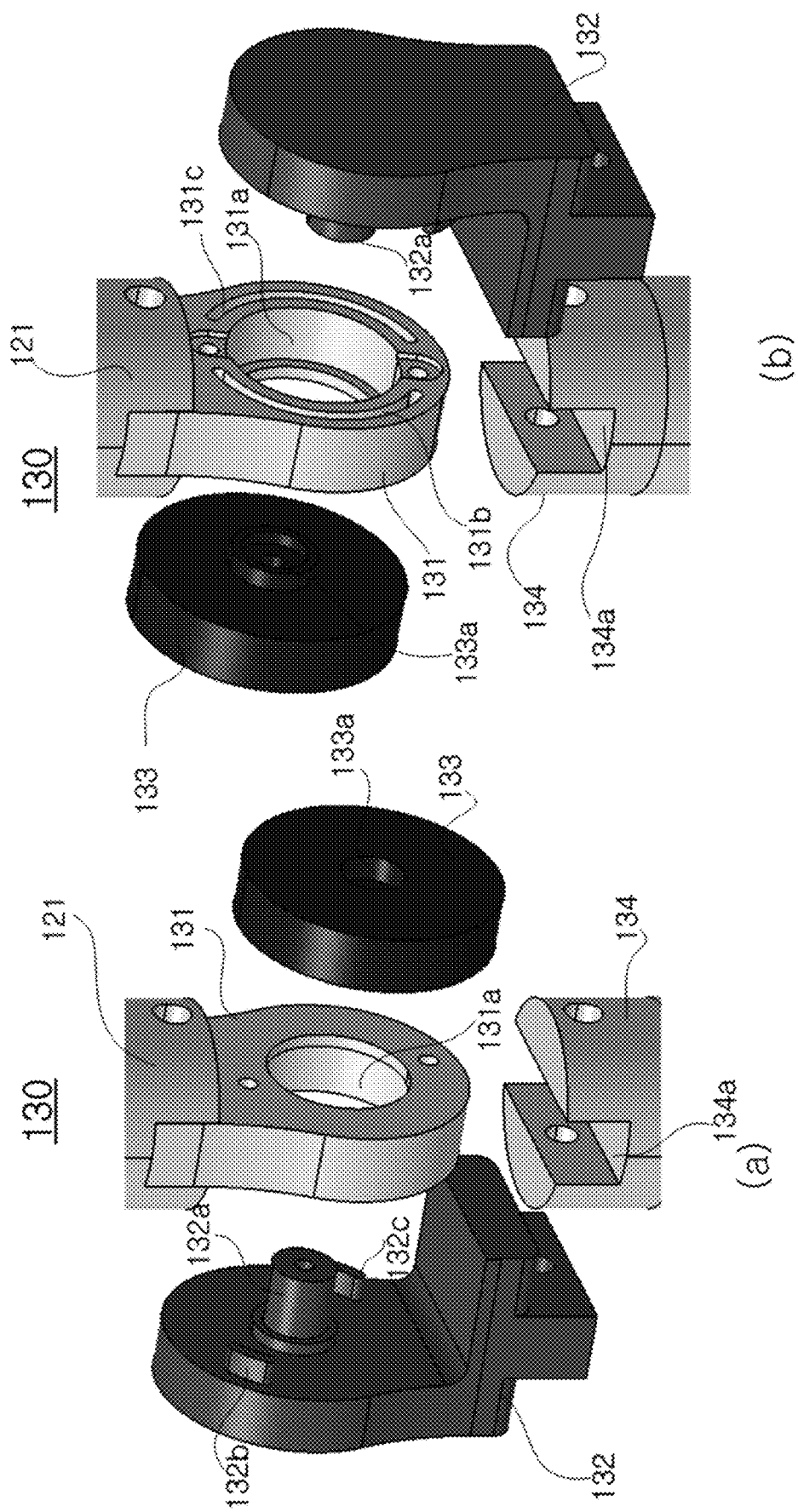

FIG. 14 is an exploded perspective view of the knee joint part 130 of FIG. 13. FIG. 14A is a left-side exploded perspective view of the knee joint part 130, and FIG. 14B is a more detailed exploded perspective view obtained by rotating FIG. 14A 180°.

As illustrated in FIGS. 13 and 14, the knee-shaped knee joint part 130 connects the movement assisting part 120 which is disposed above the knee joint part 130 and serves as a thigh and the leg part 150 which is disposed below the knee joint part 130 and serves as a shin. Since the knee joint part 130 is able to rotate a predetermined angle and bend like a knee joint, user convenience can be improved.

That is, the knee joint part 130 may rotate a predetermined angle within a range of 0° to 180° through a hinge shaft 131 that connects the movement assisting part 120 and the leg part 150. Here, the piston rod part 121 of the movement assisting part 120 may be connected to the hinge shaft 131.

As illustrated in FIGS. 14A and 14B, the hinge shaft 131 connected to a piston rod of the knee joint part 130 has both side surfaces which are coupled to first and second joint connecting parts 132 and 133 and supported and a lower surface which is connected to a third joint connecting part 134 and connected to the leg part 150 disposed therebelow so as to be supported.

Here, a hinge hole 131a having a predetermined diameter is formed at the center of the hinge shaft 131, and a connecting protrusion 132a of the first joint connecting part 132 passes through the hinge hole 131a and is connected and coupled to a connecting groove 133a of the second joint connecting part 133 at the opposite side. In this way, the hinge shaft 131 and the first and second joint connecting parts 132 and 133 are coupled and supported.

Also, a hinge shaft connecting groove 134a to which the hinge shaft 131 is coupled is formed in the third joint connecting part 134 to allow the hinge shaft 131 and the third joint connecting part 134 to be coupled and supported, and the third joint connecting part 134 is connected to the leg part 150 and supported. Here, an additional nut/bolt may be fastened or a fastening strength may be increased in various ways during coupling. Also, the piston rod 121 disposed above the hinge shaft 131 and connected to the hinge shaft 131 may have a through-hole formed in one side thereof by punching, and a headless bolt may be inserted into the through-hole to, through the headless bolt, further add an external housing for coupling with the movable leg length adjusting device 120. Also, the third joint connecting part 134 disposed below the hinge shaft 131 and connected to the hinge shaft 131 may have a through-hole formed in one side thereof by punching, and a headless bolt may be inserted into the through-hole to, through the headless bolt, further add another external housing for coupling with the leg part 150.

Also, an amount of rotation of the hinge shaft 131 of the knee joint part 130 may be set to correspond to a variable length of the piston rod 121 of the movement assisting part 120 disposed thereabove according to a walking state of the user, and in this way, the amount of rotation of the hinge shaft 131 can be adjusted according to the variable length. Here, an angle-of-rotation limiting structure configured to limit relative rotation is formed in the knee joint part 130 to adjust the amount of rotation according to the variable length.

That is, guide grooves 131b and 131c having a predetermined diameter are formed in one side surface of the hinge shaft 131, and guide protrusions 132b and 132c configured to move in the guide grooves 131b and 131c are formed. Here, the guide protrusions 132b and 132c coupled to the guide grooves 131b and 131c may be formed on any one of the first and second joint connecting parts 132 and 133 coupled to both side surfaces of the hinge shaft 131. For example, in FIGS. 14A and 14B, the guide protrusions 132b and 132c are formed on the first joint connecting part 132. Also, the guide grooves 131b and 131c may be provided as two guide grooves 131b and 131c that are vertically symmetrical about the hinge shaft 131, and the guide protrusions 132b and 132c coupled to the guide grooves 131b and 131c may also be formed to be vertically symmetrical about the connecting protrusion 132a. Here, in order to allow the guide protrusions 132b and 132c to move throughout the inside of the guide grooves 131b and 131c, the guide protrusions 132b and 132c are each formed to have a length shorter than the overall length of the guide groove. For example, in FIGS. 14A and 14B, as the guide grooves, arc-shaped long grooves which are almost semicircular are symmetrically formed at left and right sides about the hinge shaft, and the guide protrusions formed in the shape of a short bar move only in the arc-shaped grooves, and thus the angle of rotation is limited within the range of 0° to 180°.

Figure 15:
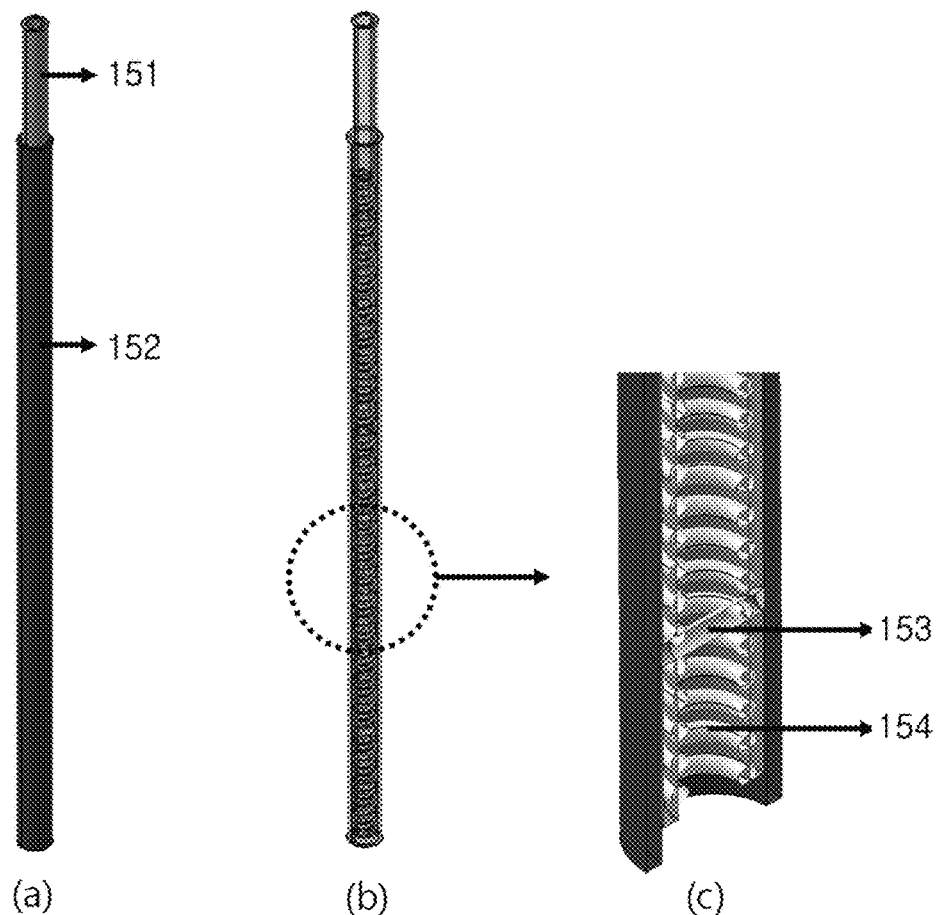
FIGS. 15 and 16 are views illustrating an embodiment of a leg part (150) in the infant carrier or article carrier (100) of FIG. 1.

FIG. 15 illustrates an embodiment of the leg part 150 in the infant carrier or article carrier 100 of FIG. 1 and shows that leg length adjustment corresponding to the height of the user is possible.

FIG. 15A is a perspective view of the leg part 150, FIG. 15B is a see-through perspective view illustrating the inside of the leg part 150 illustrated in FIG. 15A, and FIG. 15C is an enlarged internal cut-out view of a portion of the leg part 150 illustrated in FIG. 15B whose length is adjustable according to the height of the user.

Figure 16:
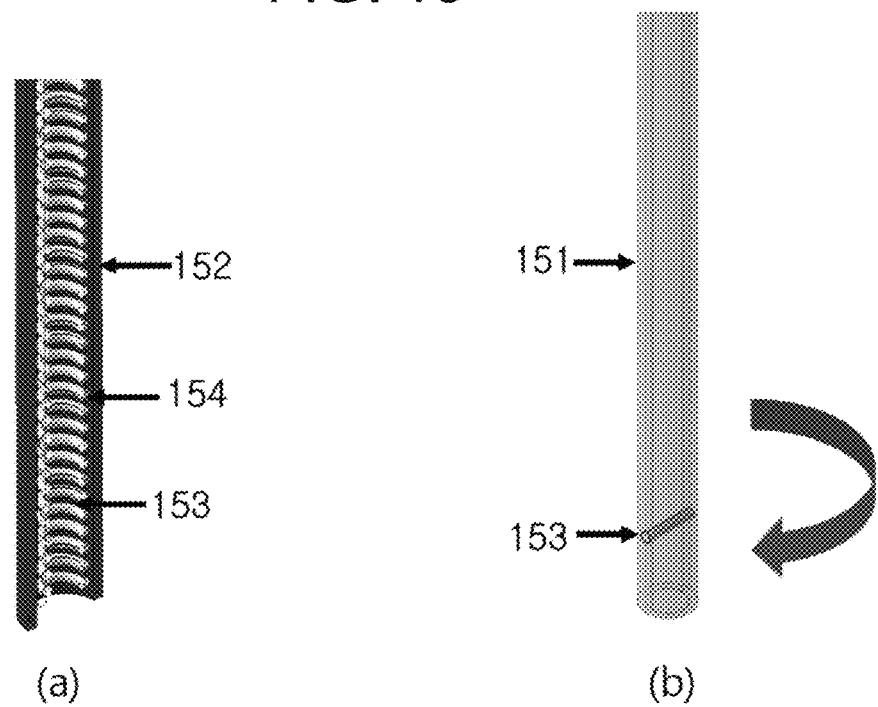

FIG. 16 is an internal exploded view illustrating a coupling state of the leg part 150 of FIG. 15. FIG. 16A is an internal cut-out view illustrating a cross-section of a second rod 152 which is an external housing of the leg part 150, and FIG. 16B is a perspective view illustrating a first rod 151 which is inserted into and coupled to the second rod 152 of FIG. 16A.

An embodiment of the leg part 150 will be described in more detail with reference to FIGS. 15 and 16.

As illustrated in FIGS. 15A to 15C, the leg part 150 at a lower portion according to the present invention includes the first rod 151 which has one side surface connected to the third joint connecting part 134 of the knee joint part 130 and the second rod 152 which serves as an external housing that is concentric with the first rod 151 and embeds and covers the first rod. Here, the first rod 151 and the second rod 152 have a rod-like cylindrical shape, are concentric with each other, and have diameters of different sizes and lengths. That is, since the first rod 151 is inserted into the second rod 152, the diameter of the second rod 152 is larger than the diameter of the first rod 151, and since the length is adjusted according to rotation of the first rod 151 embedded in the second rod 152, the overall length of the second rod 152 may be shorter than the overall length of the first rod 151 in the longitudinal direction.

First, as illustrated in FIG. 16B, since the first rod 151 is a support structure which is a rod-type structure, materials such as metal or rigid plastic may be used for the first rod 151. Also, a bar-shaped pin 153 is formed at a lower portion of the first rod 151, is formed to protrude a predetermined length from left and right sides of the rod-type first rod 151, and is formed to be tilted at a predetermined angle.

As illustrated in FIG. 16A, since the second rod 152 is a support structure which is a rod-type structure, materials such as metal or rigid plastic may be used for the second rod 152. Also, a coil spring 154 which serves as an elastic structure for absorbing impact of the weight of the infant placed on the support part 110 is inserted into and coupled to the second rod 152. Through the coil spring 154, elasticity may be provided in the vertical direction when the infant placed on the support part 110 moves vertically.

Also, the first rod 151 having the bar-shaped pin 153 formed therein is embedded in the coil spring 154 of the second rod 152, and in this way, the first rod 151 and the second rod 152 are coupled and integrally formed. Here, the bar-shaped pin 153 is supported by being inserted into gaps of the coil spring 154. Here, as illustrated in FIG. 16B, according to clockwise rotation of the first rod 151, the bar-shaped pin 153 of the first rod 151 rotates along the coil spring 154 of the second rod 152, and thus linear motion is generated in the longitudinal direction. In this way, as the bar-shaped pin 153 linearly moves upward from the bottom surface according to clockwise rotation of the first rod 151, the length of the leg part 150 may increase, and conversely, the length of the leg part 150 may decrease according to counterclockwise rotation of the first rod 151, and thus length adjustment is possible. Also, a direction of rotation can be set in the opposite manner by adjusting an angle of inclination of the bar-shaped pin 153.

Also, the leg part 150 is a connecting part configured to transmit a load of the support part 110 to the bottom surface and may be configured to have various motions structures and shapes by adding a degree of freedom using a connection link or the like according to a human body model.

As described above, the movement assisting part 120 serves as a thigh disposed at an upper portion and is interlocked to thigh movement according to the user's movement state, and the angle of the movement assisting part 120 is adjusted to correspond to the user's walking state so that use convenience is provided during movement of the infant carrier or article carrier 100. Also, the leg part 150 serves as a shin disposed at a lower portion, and the length of the leg part 150 may be adjusted to correspond to the user's height.

The technical spirits described above in the embodiments of the present invention may be carried out independently or carried out in combinations. Also, although the present invention has been described using the embodiments illustrated in the drawings and described in the above detailed description, the embodiments are only illustrative, and various modifications and other equivalent embodiments may be made from the above embodiments by those of ordinary skill in the art to which the present invention pertains. Therefore, the technical scope of the present invention should be defined by the attached claims.

INDUSTRIAL APPLICABILITY

The present invention can be used as an infant carrier that can move freely while supporting an infant while leaning on the user's legs or thighs.

In addition, it can be applied to an article carrier for delivery or an article carrier capable of transporting heavy goods.

The invention claimed is:

1. An infant carrier or article carrier comprising:
a support part configured to support an infant or an article;
a leg part which is in the form of a leg, connected from both directions to the support part through an upper portion, and configured to connect the support part to a bottom surface disposed at a lower portion;
a movement assisting part which is disposed above the leg part, connected from both directions to the support part, and configured to distribute
the weight of the infant on the support part or the load of the article on the support part to correspond to a movement state of a user and adjust an angle to correspond to the movement state of the user in order to facilitate movement;
a knee joint part which is in the form of a knee and has one side surface coupled to the movement assisting part disposed thereabove to allow the angle adjustment corresponding to the movement state and the other side surface coupled to the leg part disposed therebelow; and
a bottom surface contact part which has one side surface coupled to one side surface of the leg part and the other side surface allowing the leg part to be stably supported on the bottom surface,
wherein the movement assisting part includes a connecting part which is connected to the leg part both directions from the bottom part and connected to the support part from the top part, and a cam structure for adjusting the displacement of a spring and the angle of the connecting part between the spring and the connection part according to the movement state of the user,
wherein the movement assisting part includes a piston rod part which has one side surface connected to the connecting part to support the connecting part and which vertically moves in a cylindrical case, and a spring wound on an outer peripheral surface of the piston rod part and configured to absorb the load of the support part, thereby a force of a load is transmitted in a Z-axis direction, a direction of gravity, to reduce the weight placed on the user,
wherein the cam is semispherical shape.

2. The infant carrier or article carrier of claim 1, wherein further includes a seat
rotating part which is connected to the connecting part through a lower portion, connected to the support part through an upper portion to support the support part, and configured to allow the support part to maintain a horizontal axis even during movement thereof.

3. The infant carrier or article carrier of claim 1, wherein the leg part includes:
a first rod which has one side surface connected to the support part to support the support part and the other side surface connected to the knee joint part;
a second rod which serves as an external housing that is concentric with the first rod and embeds and covers the first rod;
a pin which is formed at one side of the first rod; and
a coil spring which is coupled to an inner portion of the second rod.

* * * * *